| United States Patent [19] | [11] Patent Number: 4,775,544 |
| Brown et al. | [45] Date of Patent: Oct. 4, 1988 |

[54] METHOD FOR PLASTICIZING NUTS AND THE LIKE

[75] Inventors: Jerry L. Brown; Harry N. Lukenbill, both of Louisville, Ky.

[73] Assignee: Carrier Vibrating Equipment, Inc., Louisville, Ky.

[21] Appl. No.: 944,197

[22] Filed: Dec. 22, 1986

[51] Int. Cl.⁴ .............................................. A23L 1/36
[52] U.S. Cl. ..................................... 426/632; 426/456
[58] Field of Search ............... 426/456, 506, 464, 629, 426/632, 482, 507, 508, 455

[56] References Cited

U.S. PATENT DOCUMENTS

| | | | |
|---|---|---|---|
| 1,448,520 | 3/1923 | Castruccio | 426/482 |
| 1,465,829 | 8/1923 | Pierce | 426/507 |
| 1,664,334 | 3/1928 | Thompson et al. | 426/482 |
| 2,273,183 | 2/1942 | Edes | 426/482 |
| 2,278,941 | 4/1942 | Musher | 426/632 |
| 2,318,265 | 5/1943 | Stagmeier | 426/506 |
| 2,579,245 | 12/1951 | Steiner | 426/506 |
| 3,594,185 | 7/1971 | Hawley et al. | 426/482 |
| 4,276,316 | 6/1981 | Sharma | 426/482 |

FOREIGN PATENT DOCUMENTS

| | | | |
|---|---|---|---|
| 216616 | 12/1984 | Fed. Rep. of Germany | 426/632 |
| 263518 | 12/1926 | United Kingdom | 426/508 |

*Primary Examiner*—Donald E. Czaja
*Assistant Examiner*—Carolyn Paden
*Attorney, Agent, or Firm*—Jon C. Winger

[57] ABSTRACT

A method for plasticizing nuts, such as almonds and the like, includes the steps of heating a mass or bulk of nuts in a dry atmosphere to a uniform temperature as they are being conveyed, and moisturing the nuts to a preselected moisture content as they are being conveyed. The method further includes at least partially or semi-fluidizing the mass of nuts as they are being heated and moisturized. The method also includes heating the moisturized nuts to dry the skins of the nuts. An apparatus for plasticizing nuts, such as almonds and the like, includes a vibrating housing along which the nuts are conveyed in mass from one end to the other end thereof. The housing includes a perforated deck plate over which the mass of nuts move and defining an air chamber below the deck plate. The air chamber is divided into three plenums along the length of the housing. The first and third plenums located at the opposite ends of the housing are each supplied with heated air which passes through the perforated deck to heat the mass of nuts. The second or middle one of the plenums is supplied with steam to moisturize the nuts.

19 Claims, 1 Drawing Sheet

METHOD FOR PLASTICIZING NUTS AND THE LIKE

BACKGROUND OF THE INVENTION

1. Field of the Invention

The present invention relates to plasticizing nuts, such as almonds and the like.

2. Discussion of the Prior-Art

It is a practice in the food art to slice or sliver nuts such as almonds and the like. In order to slice or sliver nuts so they will not crack or break up, the nuts must be first plasticized.

Nuts, such as almonds, are typically plasticized by a batch process wherein a batch of nuts is deposited in a vat of boiling water. This process has a number of drawbacks. Some of the moisture content of the nuts, and it tends to remove the skins of. the nuts. Therefore, this known process adds to the cost of processing the nuts, not only because it is slow, but also because it can easily damage some of the nuts which then must be discarded or lowers the commercial value of the nuts.

SUMMARY OF THE INVENTION

The present invention recognizes these drawbacks and provides a solution thereto.

It is an objective of the present invention to provide a method and apparatus for plasticizing nuts which does not remove the skins from the nuts in the process.

It is another objective of the present invention to provide a method and apparatus for plasticizing nuts which provides for the ready control of the moisture content of the nuts.

It is a further object of the present invention to plasticize the nuts without loosening the nut skins and indeed fastening the nut skins to the nut meat so that the nuts can be sliced while maintaining the skin on the peripheral edges of the nut slices.

It is still another objective of the present invention to provide a method and apparatus which plasticizes a mass or bulk of nuts on a continuous, as opposed to a batch, basis.

More particularly, the present invention provides a method for plasticizing nuts such as almonds and the like comprising heating a mass of nuts in a dry atmosphere while continuously conveying the nuts, and steaming the nuts to reorder the moisture of the nuts to a predetermined moisture content while continuously conveying the nuts.

The present invention further provides an apparatus for plasticizing nuts such as almonds and the like comprising a gas permeable surface along which nuts to be plasticized are to be conveyed from one end of the surface to the other end of the surface, means for passing heated air through the gas permeable surface in a first zone proximate one end thereof for heating the nuts being conveyed, means for passing steam through the gas permeable surface in a second zone downstream of the first zone for reordering the moisture content of the nuts being conveyed to a preselected moisture content, and means for passing heated air through the gas permeable surface in a third zone downstream of the second zone for drying the exterior surface of the nuts being conveyed.

BRIEF DESCRIPTION OF THE DRAWINGS

These and other objectives and features of the present invention will become even more clear upon reference to the following description in conjunction with the accompanying drawings in which like numerals refer to the parts through the several views and wherein.

DETAILED DESCRIPTION OF THE PREFERRED EMBODIMENT

Figure 2:
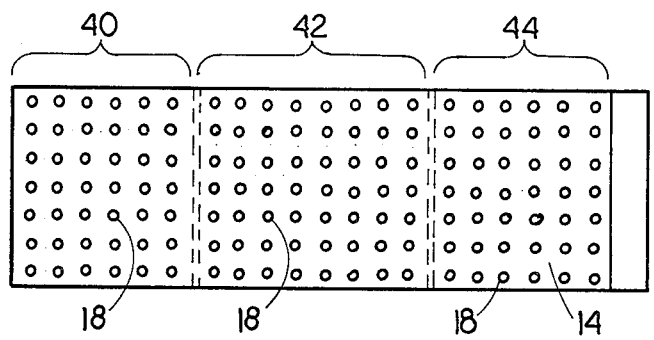
FIG. 2 is a top view of the apparatus of FIG. 1.

The method of the present invention includes initially heating a mass of nuts with dry air, and then moisturizing the heated nuts with steam so that moisture will penetrate the nut skin and permeate the nut meat, thus, reordering the moisture of the nuts to a predetermined moisture content. The nuts are initially heated to prevent moisture condensation on the exterior surface of the nuts when subjected to the steam. Preferably, after the nuts are moisturized, the nuts are again heated with dry air so that at least the nut skins are dried. The method is carried out by first heating a mass or bulked nuts with relatively dry heated air to a first predetermined temperature. For example, if the nuts are natural almonds having skins, the almond nuts are heated to a temperature of approximately 135° F. to dry the nuts. Next, the heated nuts are subjected to steam for a sufficient time to reorder or induce a predetermined moisture content. For example, if the nuts are natural nuts having skins, the moisture of the heated almond nuts is increased from about 3.0% by weight to a moisture content of about 6.0% by weight. Optionally, the moisturized nuts are then again heated with dry air to another predetermined temperature sufficient to dry at least the exterior of the nut such as the nut skins.

In an advantageous embodiment, the method further includes continuously conveying the nuts in mass or bulk along a predetermined path while sequentially subjecting the nuts being conveyed to a heated air flow, a stream of moisturizing steam, and another heated air flow to dry at least the nut skins.

In the advantageous embodiment, the method also includes continuously conveying the nuts along a predetermined path while subjecting the nuts to a vibration which tumbles the nuts and prevents the nuts from settling together as they are being conveyed.

While the nuts are being continuously conveyed and vibrated, the nuts can be subjected to moving air to at least semi-fluidize the mass or bulk of nuts minimizing contact between the individual nuts of the mass and preventing abrasion of the nuts which could damage or remove the nut skins. Fluidizing a particulate mass means to pass a gas stream through the mass to float or suspend the particulates in the gas stream. In the present invention, the nuts need not be suspended in the air flow in the strict sense of fluidizing, but may be allowed to rise and fall in the air flow. Thus, the term semi-fluidized as used herein means that the air flow can be of such a velocity as to cause the nuts to rise and fall in the air flow.

Advantageously, the method comprises continuously conveying the mass or bulk o nuts along a path while heating the nuts in a first zone or region along the path, moisturizing the heated nuts in a second zone or region along the path, and drying the exterior or skins of the moistened nut in a third zone or region along the path.

The flow of dry air used to heat the nuts in the first zone and the flow of dry air used to dry the nut skins in the third zone can also be the same air used to at least semi-fluidize the mass of nuts moving across the first and third zones. Similarly, an air flow can be included with the steam used to moisturize the nuts in the second zone to at least semi-fluidize the mass of nuts moving across the second zone. In addition, the flow of air in the first conveying zone also functions to clean the nuts of surface debris.

It is contemplated that the nuts being heated in the first zone and being dried in the third zone can be heated to about same temperature. Toward this objective, the air flow in the first zone and air flow in the third zone can be at approximately the same temperature. In heating almonds, it has been determined that the almonds be subjected to the hot dry air flow for a period of time sufficient to heat the nuts in the first zone to a temperature of approximately 135° F.

It is even further contemplated that the nuts being dried in the third zone can be subjected to a higher temperature than the nuts being heated in the first zone. Toward this objective, the temperature of the air flow in the third zone can be approximately the same as the temperature of the air in the first zone, but the time to which the mass of nuts are subjected to the air flow can be longer in the third zone than in the first zone. This can be accomplished by making the third zone of the conveying path longer than the conveying path of the first zone. Alternatively, the heated air flow in the third conveying zone can be at a higher temperature than the heated air in the first conveying zone.

The initial heating of the nuts prevents subsequent condensation of moisture on the nuts during the steaming of the nuts. The heating of the steamed nuts dries the exterior surface of the steamed nuts to further prevent condensation on the surface of the nuts. Further, when natural nuts having skins processed, the heating of the steamed nuts causes the skins to be securely fastened to the nut. It is speculated that heating the steamed nuts set or cures the starch at the interface of the nut and skin which had been softened during steaming.

Figure 1:
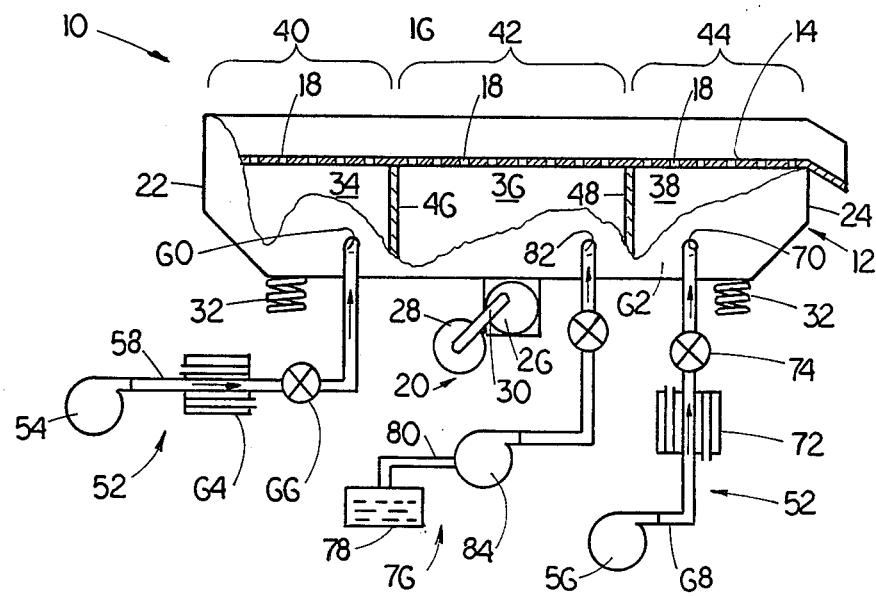
FIG. 1 is a schematic representation of an apparatus of the present invention with portions broken away to more clearly show internal details.

Now with reference to FIGS. 1 and 2, there is shown an apparatus, generally denoted as the numeral 10, of the present invention for performing the above discussed method of the present invention. As illustrated, the apparatus 10 includes an elongated, generally horizontal housing 12 along which the nuts to be plasticized are continuously conveyed.

The housing 12 includes a gas permeable deck plate 14 located generally horizontally in the housing 12 extending along the entire length and width defining an air chamber in the lower region of the housing 12 beneath the deck plate 14. The deck plate 14 is formed with perforations 18 to direct jets of air generally upwardly from the air chamber 18.

The apparatus 10 further includes vibrating means, generally denoted as the numeral 20, to impart a vibrating force to the housing 12 having at least a vector component "H" generally parallel to the longitudinal axis of the housing 12 in the direction generally from the upstream housing wall 22 toward the downstream housing wall 24. Preferably, the vibrating force has both the horizontal vector component "H" and a vertical vector downstream housing wall 24. Preferably, the vibrating force has both the horizontal vector component "H" and a vertical vector component "V". The vibrating means 20 can comprise virtually any convenient or conventional device known to the art. For the sake of illustration, the vibrating means 20 is shown as an eccentric drive system having a driven disc 26 affixed to the housing 12 for rotation about an eccentrically located axis, a motor 28, and a link arm 30 affixed at one of its ends to the output shaft of the motor 28 for rotation therewith and rotatably affixed at its other end to the disc 26 near the disc periphery. Thus, as the motor output shaft rotates, the eccentric disc 26 imparts a vibratory force to the housing 12. In addition, the housing 12 is supported on resilient vibration means 32 such as, for example, coil springs.

With reference to FIG. 1, the air chamber of the housing 12 is divided into a plurality of plenums, for example three plenums 34, 36 and 38, to divide the flow of gas or air through the perforated deck plate 14 into three zones 40, 42 and 44 above the deck plate 14 sequentially along the length of the deck plate 14. Toward this objective, a first generally vertical air impermeable partition 46 is located in the air chamber across the width of the housing 12 and spaced from the upstream housing end wall 22 longitudinally of the housing 12 defining the first plenum 34 between the first partition 46 and upstream housing end wall 22, a second generally vertical air impermeable partition 48 is located in the air chamber 16 across the width of the housing 12 and spaced from the first partition 46 longitudinally of the partition 46 and second partition 38, and defining the third plenum 38 between the second partition 48 and downstream housing end wall 24.

With reference to FIGS. 1 and 2, the perforations 18 through the deck plate 16 can be all of the same diameter, or the diameter of the perforations 18 in the different zones 40, 42 and 44 may be of different diameters to provide different air flow rates or velocities above the perforated deck plate 14. In addition, while the central axis of the perforations 18 through the deck plate 14 is shown as being vertical, the central axis of the perforations 18 may be at an angle to the vertical so that the jets of air issuing through the perforations 18 have both vertical and horizontal components. It is foreseeable that perforations 18 having a central axis at an angle to the vertical to provide directed jets of air having a horizontal vector component may be useful in that such air jets would not only buoy-up or at least semi-fluidize the mass or bulk of nuts, but also tend to move the nuts on the housing deck plate 16 in the direction of the horizontal component. The perforations 18 through the deck plate 14 can be arranged in the same preselected geometric pattern in each of the zones 40, 42, 44 as illustrated in FIG. 2, or the perforations 18 can be arranged in different preselected geometric patterns in each of the zones 40, 42 and 44 to provide different air flow patterns above the perforated deck plate 14.

With reference to FIG. 1 the apparatus 10 further includes air supply means, generally denoted as the numeral 52 for supplying air to the first plenum 34 and third plenum 38. As shown, the air supply means 52 comprises two air blowers 54 and 56 for supplying air to the first plenum 34 and third plenum 38, respectively. The first blower 54 is in air flow communication with the first plenum 34 through an air conduit 58 associated at its inlet end with the outlet of the first blower 54 and associated at its outlet end with an appropriate aperture 60 in the side wall 62 of the housing 12 into the first plenum 34. Air heating means, such as a heat exchanger 64, is lcoated in the air conduit 58 to heat the air flowing into the first plenum 34 to a first predetermined temperature. The heating means 64 can be of virtually any type, for example, a steam to air heat exchanger. In addition, a damper 66 is located in the air flow conduit 58 to provide for selecting different air flows to the first plenum 34. The second blower 56 is in air flow communication with the third plenum 38 through an air conduit 68 associated at its inlet end with the outlet of the second blower 56 and associated at its outlet end with an appropriate aperture 70 in the side wall 62 of the housing 12 into the third plenum 38. Air heating means, such as an heat exchanger 72, is located in the air conduit 68 to heat the air flowing into the third plenum 38 to a second predetermined temperature. In addition, a damper 74 is located in the air flow conduit 68 to provide for selecting different air flows to the third plenum 38.

The apparatus 10 also comprises steam supply means 76 for supplying steam to the second plenum 36. As shown, the steam supply means 76 includes a steam source 78 in flow communication with the second plenum 36 through a conduit 80 associated at its inlet end with the steam source 78 and associated at its outlet end with an appropriate aperture 82 in the side wall 62 of the housing 12 into the second plenum 36. Optionally, a blower 84 is positioned in the conduit 80 downststream of the steam source 78 to move air and steam to the second plenum 36 to at least semi-fluidize the nuts moving through the second zone 42.

Figure 3:
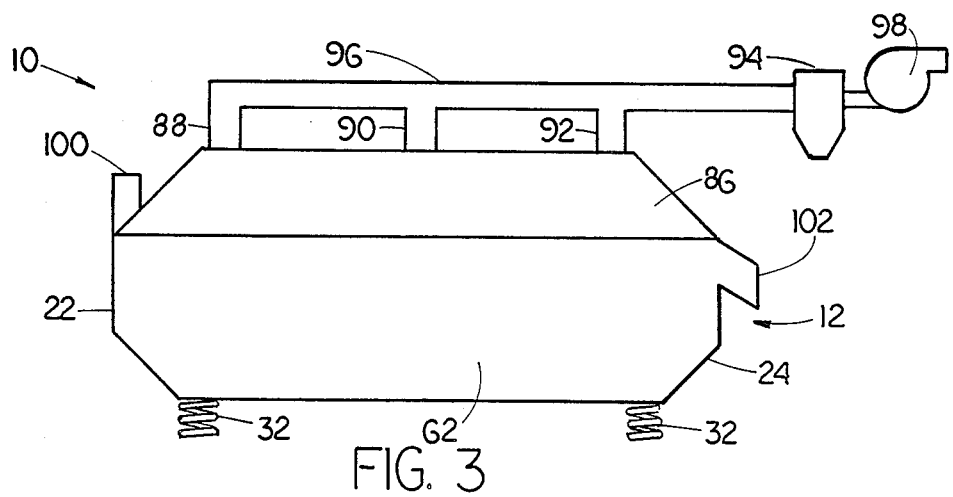
FIG. 3 is a schematic representation of the apparatus of FIG. 1 illustrating an additional component.

Now with reference to FIG. 3, the apparatus 10 can further include an exhaust hood 86 located over the housing 12 covering for example, three exhaust ports 88, 90 and 92 located at the top of the exhaust hood 86. As shown, each exhaust port 88, 90, 92 is generally centered over a different one of the three zones 40, 42 and 44. The exhaust ports 80, 90 and 92 can be connected to a dust collector 94 by ducts 96. Air moving means 98 can be located downstream of the dust collector 94 creating an updraft in the exhaust hood 86, through the ducts 96 and through the dust collector 94. In addition, the exhaust hood 86 can include a nut inlet 100 over the deck plate 14 at the first zone 40 proximate the upstream end wall 27 of the housing 12 for charging the apparatus 10 with nuts to be processed, and a nut outlet 102 at the deck plate 14 at the end of the third zone 44 proximate the downstream end wall 24 of the housing 12 for removing plasticized nuts from the apparatus 10.

The foregoing detailed description is given primarily for clearness of understanding and no unnecessary limitations are to be understood therefrom for modifications will become obvious to those skilled in the art upon reading this disclosure and can be made without departing from the spirit of the invention and scope of the appended claims.

What is claimed is:

1. A method for plasticizing nuts comprising the steps of:
   continuously conveying the nuts along a predetermined path;
   heating a mass of nuts in a substantially dry atmosphere for a time sufficient to heat at least the exterior surface of the nuts as the nuts are being conveyed; and then,
   steaming the heated nuts to reorder the moisture of the nuts to a preselected moisture content sufficient to plasticize the nuts while retaining the skins on those nuts having skins as the nuts are being conveyed.

2. The method of claim 1, comprising at least semi-fluidizing the mass of nuts as the nuts are being heated.

3. The method of claim 2, comprising:
   tumbling the nuts to prevent them from settling together as the mass of nuts is being at least semi-fluidized and heated.

4. The method of claim 1, comprising at least semi-fluidizing the nuts as they are being steamed.

5. The method of claim 1, wherein the step of heating the mass of nuts comprises passing a flow of heated air through the mass of nuts.

6. The method of claim 1, wherein the step of steaming the heated nuts comprise passing a flow of steam through the mass of nuts.

7. The method of claim 1 comprises tumbling the nuts as the mass of nuts is being steamed.

8. The method of claim 1, wherein the step of conveying the mass of nuts comprises tumbling the nuts in the direction in which the mass of nuts are to be conveyed.

9. The method of claim 1, comprising the step of cleaning the exterior surface of the nuts of surface debris as the nuts are being heated in the substantially dry atmosphere and being conveyed.

10. The method of claim 9, wherein the step of heating the mass of steamed nuts comprising passing a flow of heated air through the mass of nuts.

11. The method of claim 1, comprising the further step of heating the steamed mass of nuts in a substantially dry atmosphere sufficient to dry at least the exterior surface of the nuts.

12. The method of claim 11, comprising:
   at least semi-fluidizing the mass of nuts as the nuts are being heated prior to steaming; and
   at least semi-fluidizing the mass of steamed nuts as the nuts are being dried.

13. The method of claim 12, comprising at least semi-fluidizing the mass of nuts as the nuts are being steamed.

14. The method of claim 12, comprising:
   tumbling the nuts as the mass of nuts is being at least semi-fluidized and heated; and,
   tumbling the nuts as the mass of nuts is being at least semi-fluidized and dried.

15. The method of claim 14, comprising tumbling the nuts as the mass of nuts is being at least semi-fluidized and steamed.

16. The method of claim 15, wherein the step of conveying the mass of nuts comprises tumbling the nuts in the direction in which the nuts are to be conveyed.

17. The method of claim 16, wherein the step of heating the steamed nuts comprises heating the steamed nuts to the same temperature to which the nuts were heated prior to steaming.

18. The method of claim 16, wherein the step of heating the steamed nuts comprises heating the steamed nuts to a different temperature than that to which the nuts were heated prior to steaming.

19. The method of claim 11, wherein:
   the step of heating the nuts comprises passing a flow of heated air through the mass of nuts;
   the step of steaming the heated nuts comprises passing a flow of steam through the mass of nuts to reorder the moisture content of the nuts; and
   the step of heating the steamed nuts comprises passing a flow of heated air through the mass of nuts to dry the exterior surface of the nuts.

* * * * *